United States Patent
Chen et al.

[11] Patent Number: 6,139,791
[45] Date of Patent: Oct. 31, 2000

[54] METHOD OF MAKING IN-SITU TOUGHENED ALPHA PRIME SIALON-BASED CERAMICS

[75] Inventors: I-Wei Chen; Anatoly Rosenflanz, both of Ann Arbor, Mich.

[73] Assignee: The Regents of the University of Michigan, Ann Arbor, Mich.

[21] Appl. No.: 09/157,088

[22] Filed: Sep. 18, 1998

Related U.S. Application Data

[63] Continuation of application No. 08/753,359, Nov. 25, 1996, abandoned, which is a continuation of application No. 09/012,855, Jan. 23, 1998, Pat. No. 5,908,798.

[51] Int. Cl.[7] .................................................. C04B 35/00
[52] U.S. Cl. ..................... 264/642; 264/683; 501/98.1; 501/98.2; 501/98.3
[58] Field of Search .................................... 264/641, 642, 264/662, 663, 683; 501/98.1, 98.2, 98.3

[56] References Cited

U.S. PATENT DOCUMENTS

| | | |
|---|---|---|
| 4,547,470 | 10/1985 | Tanase et al. . |
| 4,563,433 | 1/1986 | Yeckley et al. . |
| 4,826,791 | 5/1989 | Mehrotra et al. . |
| 4,845,059 | 7/1989 | Mehrotra et al. . |
| 4,873,210 | 10/1989 | Hsieh . |
| 4,880,755 | 11/1989 | Mehrotra et al. . |
| 4,913,936 | 4/1990 | Mehrotra et al. . |
| 4,977,113 | 12/1990 | Phelps et al. ............................. 501/98 |
| 5,120,682 | 6/1992 | Ukyo et al. . |
| 5,120,687 | 6/1992 | Hsieh . |
| 5,122,317 | 6/1992 | Chen et al. . |
| 5,227,346 | 7/1993 | Hwang et al. . |
| 5,238,885 | 8/1993 | Asayama et al. . |
| 5,264,297 | 11/1993 | Jindal et al. . |
| 5,312,785 | 5/1994 | Pyzik et al. . |
| 5,316,988 | 5/1994 | O'Brien et al. . |
| 5,370,716 | 12/1994 | Mehrotra et al. . |
| 5,413,972 | 5/1995 | Hwang et al. . |
| 5,468,696 | 11/1995 | Ishizawa et al. . |
| 5,580,510 | 12/1996 | Tien et al. . |

FOREIGN PATENT DOCUMENTS 1092637  11/1967  United Kingdom .

OTHER PUBLICATIONS

Hardie, D. and Jack, K.H., Crystal Structures of Silicon Nitride, *Nature*, 180, 332–22 (1957).

Lange, F.F., Relation Between Strength Fracture Energy, and Microstructure of Hot–Pressed $Si_3N_4$, *J. Am. Ceram. Soc.*, 56 [10] 518–22 (1973).

Hampshire, S., Park, H.K., Thompson, D.P., and Jack, K.H., α'SiAlON ceramics, *Nature*, 274, 880–82 (1978).

Lange, F.F., Fracture Toughness of $Si_3N_4$ as a Function of the Initial α–Phase Content, *J. Am. Ceram. Soc.*, 62 [7–8] 428–30 (1979).

Lewis, M.H., Fung, R., and Taplin, D.M.R., Identation Plasticity and Fracture of $Si_3N_4$ Ceramic Alloys. *J. Mater. Sci.*, 16, 3437 (1981).

Becher, P.F., Microstructure Design of Toughened Ceramics, *J. Am. Ceram. Soc.*, 74 [2] 255–69 (1991).

Cao, et al., "α'–SiAlon Ceramics: A Review," *Chem. Mater.*, 3, 242–252 (1991).

Ekström, T. and Nygren, M., SiAlon Ceramics, *J. Am. Ceram. Soc.*, 75 [2] 259–76 (1992).

Jack, "SiAlon Ceramics: Retrospect and Prospect," *Mat. Res. Soc. Symp. Proc.*, vol. 287, pp. 25–27 (1993).

(List continued on next page.)

*Primary Examiner*—Christopher A. Fiorilla
*Attorney, Agent, or Firm*—Dobrusin Darden Thennisch & Lorenz PllC

[57] ABSTRACT

A method for making an alpha prime SiAlON-based ceramic article, including the steps of providing an admixture of starting materials and densifying said admixture. The admixture includes: beta silicon nitride; a source of aluminum selected from the group consisting of aluminum nitride, alumina, and mixtures thereof; at least one oxide compound; and a plurality of alpha prime SiAlON seeds.

6 Claims, 2 Drawing Sheets

OTHER PUBLICATIONS

Katz, "Applications of Silicon Nitride Based Ceramics in the U.S.," *Mat. Res. Soc. Symp. Proc.*, vo. 287, pp. 197–208 (1993).

Lai, K–R and Tien, T–Y, "Kinetics of $\beta$–$Si_3N_4$ Grain Growth in $Si_3N_4$ Ceramics Sintered Under High Nitrogen Pressure," *J. Am. Ceram. Soc.* 76[1] 91–96 (1993).

Hoffman, "Analysis of Microstructural Development and Mechanical Properties of $Si_3N_4$ Ceramics," Tailoring of Mechanical Properties of $Si_3N_4$ Ceramics (M.J. Hoffman and G. Petzow (eds.)), pp. 59–72 (1994).

Padture, "In Situ—Toughened Silicon Carbide," *J. Am. Ceram. Soc.*, 77[2], 519–23 (1994).

Sheu, "Microstructure and Mechanical Properties of the In–Situ $\beta Si_3N_4$/$\alpha'$–SiAlon Composite," *J. Am. Ceram. Soc.*, 77[9], 2345–53 (1994).

Mitomo et al., "Fine–Grained Silicon Nitride Ceramics Prepared from $\beta$–Power," *J. Am. Ceram. Soc.*, 78[1], 211–14 (1995).

Riedel, R., Kleebe, H–J., and Schonfelder, H., A covalent micro/nanocomposite resistant to high–temperature oxidation, *Nature*, 374, 526–28 (1995).

Hwang, C.J., Susintsky, D.W., and Beamna, D.R., Preparation of Multication 60 'SiAlon Containing Strontium, *J. Am. Ceram. Soc.*, 78 [3] 588–92 (1995).

Shen et al., "Temperature Stability of Samarium–Doped $\alpha'$SiAlon Ceramics," *J. Euro. Ceram. Soc.*, 16[1], 43–53 (1996).

Shen et al., "Ytterbium–stabilized $\alpha'$SiAlon ceramics," *J. Physics D: Applied Phys.*, 29[3], 893–904 (1996).

Riedel, R. Kienzie, A., Dressler, W., Ruwisch, L., Bill, Jr., and Aldinger, F., A silicoboron carbonitride ceramic stable to 2,000 degree C, *Nature*, 382, 796–86 (1996).

Wang, H., Cheng, Y–B., Muddle, B.C., Gao, L., and Yen, T.S., Preferred orientation in hotpressed Ca $\alpha'$SiAlon ceramics, *J. Mater. Sci. Lett.*, 15, 1447–49 (1996).

Shen, Z., Ekström, T., and Nygren, M., Temperatures Stability of Samarium–Doped $\alpha'$SiAlon Ceramics, *J. Eur. Ceram. Soc.*, 16 43–53 (1996).

Shen, Z., Ekström, T., and Nygren, M., Ytterbium–stabilized $\alpha'$SiAlon ceramics, *J. Phys. D: Appl. Phys.*, 296, 893–904 (1996).

Nakayasu, T., Yamada, T., Tanaka, I., Adachi, H., and Goto, S., Electronic Structures of $Ln^{3+}\alpha'$SiAlons with Correlations to Solubility and Solution Effects, *J.Am. Ceramic. Soc.*, 79, [10] 2527–32 (1996).

Shen, Z., Ekström, T., and Nygren, M., Homogeneity Region and Thermal Stability of Neodymium–Doped $\alpha'$SiAlon Ceramics, *J. Am. Ceram. Soc.*, 79, 721–32 (1996).

Shen, Z., Nordberg, L–O Nygren, M., and Ekström, T., "$\alpha'$SiAlon Grains with High Aspect Ration—Utopia or Reality," *Proc. Nato AST Engineering Ceramics '96—Higher Reliability through Processing*, Ed. Babini, G.N., Kluwer Acad. Publ., Dordrecht, Netherlands, 169–78 (1997).

Nordberg, L–O, Shen, Z., Nygren, M., and Ekström, T., On the Extension of the $\alpha'$SiAlon Solid Solution Range and Anisotropic Grain Growth in Sm–Doped $\alpha'$SiAlon Ceramics. *J. Eur. Ceram. Soc.*, 17, 575–80 (1997).

Huang, Z.K., Jiang, Y.Z., Tien, T.Y., "Formation of $\alpha$–SiAlon$_x$ with Dual Modifying Cations (Li+Y and Ca+Y)," *J. Mat'ls. Sci. Letters*, vol. 16, pp. 747–751 (1997) and circumstances.

Thompson, Derek, "Tough Cookery" *Nature*, vol. 389, p. 675 (1997).

Rosenflanz, Anatoly Zhanovich, "$\alpha'$–SiAlon: Phase Stability, Phase Transformations and Microstructural Evolutions" Dissertation (1997).

International Search Report, International Application No. PCT/US97/21263, filed Nov. 21, 1997.

METHOD OF MAKING IN-SITU TOUGHENED ALPHA PRIME SIALON-BASED CERAMICS

This application is a continuation of applications Ser. No. 08/753,359, filed on Nov. 25, 1996 now abandoned and Ser. No. 09/012,855, filed Jan. 23, 1998, now U.S. Pat. No. 5,908,798.

GOVERNMENT SUPPORT STATEMENT

This application was made with government support under grant #F 49620-95-1-0119 and #F 49620-95-1-0460. The government has certain rights in the invention.

BACKGROUND OF THE INVENTION

1. Technical Field

The present invention relates to silicon nitride-based ceramic systems and more particularly to silicon nitride-based ceramic systems having a relatively high proportion of alpha prime SiAlON and exhibiting relatively high hardness and toughness.

2. Discussion

Silicon nitride materials currently occupy an important and growing portion of the market for materials for many commercial applications. It has become an increasingly important material, for instance, in the cutting tool and bearing industries, and continues to receive attention in the automotive component market. As compared with conventional ceramic materials, such as carbide-based materials, or steel materials (e.g., M-50), silicon nitride generally offers the potential advantages of relatively high heat resistance and chemical stability, relatively low density, good mechanical properties such as hardness and toughness, and good electrical insulation characteristics. To illustrate the advantages, in the context of the cutting tool industry, these properties can combine in whole or in part to allow operations to proceed at higher speeds and temperatures, with resulting potential cost savings. The potential for the above properties and others also makes silicon nitride an attractive material (and its uses are believed to be under exploration) for other applications, such as without limitation, extrusion dies and automotive components (e.g., without limitation, turbocharger components, swirl chambers, engine valve or valve train components, etc.).

Currently there are two widely recognized groups of silicon nitride ($Si_3N_4$) ceramics that may be used with or even without reinforcing carbides. One group is referred to in the art as "alpha silicon nitride" (also denoted as $\alpha$-$Si_3N_4$). Until the present invention, alpha silicon nitride and its solid solutions, also called "alpha-prime SiAlON" (also denoted as $\alpha'$-SiAlON; in alpha-prime SiAlON, some of the Si—N bonds in alpha silicon nitride are replaced by Al—O bonds, and the material typically includes one or more other metallic elements in addition to Si and Al), typically have exhibited relatively high hardness (e.g., on the order of about 20 GPa), but relatively low toughness (e.g., on the order about 3 MPa·m½). The second group is referred to in the art as "beta silicon nitride" (also denoted as $\beta$-$Si_3N_4$). Beta silicon nitride and its solid solutions, also called "beta-prime SiAlON" (denoted as $\beta'$-SiAlON; in beta-prime SiAlON, some of the Si—N bonds in beta silicon nitride are replaced by Al—O bonds, but the material typically does not include other metallic elements in addition to Si and Al), typically have a hardness on the order of about 15.5 GPa, with an indentation toughness value on the order of about 6.5 MPa·m½. The preferred form of silicon nitride for many engineering applications has been beta silicon nitride.

In general, beta silicon nitride or beta prime SiAlON materials employ alpha silicon nitride as a starting material, and optionally may include beta-silicon nitride seeds. They are densified using any suitable conventional technique, such as pressureless sintering, gas pressure sintering, hot pressing or hot isostatic pressing. Most of the known commercial beta silicon nitride components are believed to be made by sintering, with or without a gas overpressure up to about 100 atm. The microstructure of conventional beta silicon nitride materials generally has included elongated rods of beta silicon nitride or beta prime SiAlON, which form during sintering and heat treatment, particularly where the starting materials contain a high content of alpha silicon nitride materials. These type of materials have been regarded as in-situ toughened, inasmuch as the rods are believed to form by themselves during firing and they are believed to help increase resistance to fracture in the material.

Approximate values of representative properties of beta silicon nitride-based materials are typified in the following Table I:

TABLE I

| | |
|---|---|
| Density | 3.3 $Mg/m^3$ |
| Young's Modulus | 300 GPa |
| Strength @ RT | 800 Mpa |
| Vicker Hardness/($H_v$) | 15.5 GPa |
| Indentation Toughness ($K_{IC}$) | 6.5 MPa · m½ |
| Thermal Expansion | 3.2 × $10^{-6}$/° C. |

Some silicon nitride materials also have included reinforcing carbides to improve properties such as hardness. Previously there was not believed to be any reliable way to produce a silicon nitride material that is substantially free of carbides, but which still offers the combined advantageous properties of relatively high hardness (e.g., greater than about 19 GPa) and high toughness (e.g., greater than about 5 MPa·$m^{1/2}$).

High content alpha silicon nitride (and alpha-prime SiAlON), though recognized since as early as 1978, finds considerably less application in commercial applications than does beta silicon nitride. However, powders of such materials have been used as a preferred starting material for making many beta silicon nitrides or beta prime SiAlON materials. As mentioned, the use of such starting materials has permitted the formation of elongated rods in the resulting microstructure, allowing for higher toughness. In this regard, it is believed to be well known in the art, in compositions containing (in the fired product) a combination of (1) alpha silicon nitride, alpha prime SiAlON or both, and (2) beta silicon nitride, beta prime SiAlON or both, the greater the content of the alpha or alpha prime constituent, the lower the toughness will be. Thus, the art has taught away from obtaining any substantial amounts of alpha or alpha prime constituents in the fired material, in order to avoid the potential consequences of those phases in the final silicon nitride product.

A typical alpha prime SiAlON material has a toughness on the order of about 2.5 to 3.5 MPa·$m^{1/2}$, but has a typical hardness level greater than about 19 to 21 GPa, and may even reach in some instances about 22 GPa (which tends to make it substantially higher than that of beta silicon nitride and beta prime SiAlON). It is also recognized in the art that, except under particular processing conditions (for instance, chemical vapor deposition of alpha silicon nitride (where whiskers or elongated single crystals form), or in the presence of a large amount of glass, which may degrade their strength and toughness), the attainment of elongated rod shaped grains in alpha silicon nitride and alpha prime SiAlON materials is not generally attainable after densification, such as by sintering. Because of the intrinsic difficulties in forming elongated rod shaped grains, and consequent lower toughness, alpha prime SiAlON materials have been the focus of investigation to improve toughness. The use of one or more elements such as Li, Mg, Ca, Y, Nd, Sm, Gd, Tb, Dy, Ho, Er, Tm, Yb or Lu in alpha silicon nitride or alpha prime SiAlON ceramics also has been attempted, but has not yielded a commercially useful material, which combines high hardness (greater than about 19 GPa) and high toughness (greater than about 5 MPa·m$^{1/2}$).

Patents to others that may be of interest include U.S. Pat. No. 5,468,696 (Ishizawa et al.); U.S. Pat. No. 5,370,716 (Mehrotra et al.); U.S. Pat. No. 5,316,988 (O'Brien et al.); U.S. Pat. No. 5,312,785 (Pyzik et al.); U.S. Pat. No. 5,264,297 (Jindal et al.); U.S. Pat. No. 5,238,885 (Asayama et al.); U.S. Pat. No. 5,227,346 (Hwang et al.); U.S. Pat. No. 5,120,687 (Hsieh); U.S. Pat. No. 5,120,682 (Ukyo et al.); U.S. Pat. No. 4,880,755 (Mehrotra et al.); U.S. Pat. No. 4,845,059 (Kohtoku et al.); U.S. Pat. No. 4,873,210 (Hsieh); U.S. Pat. No. 4,826,791 (Mehrotra et al.); U.S. Pat. No. 4,563,433 (Yeckley et al.); U.S. Pat. No. 4,547,470 (Tanase et al.), all of which are expressly incorporated by reference. See also, Padture, "In Situ-Toughened Silicon Carbide," J. Am. Ceram. Soc., 77[2], 519–23 (1994); Mitomo et al., "Fine Grained Silicon Nitride Ceramics Prepared from β-Powder," J. Am. Ceram. Soc., 78[1], 211–14 (1995); Ekstrom et al., "SiAlON Ceramics," J. Am. Ceram. Soc., 75[2], 259–76 (1992); Cao et al., "α'-SiAlON Ceramics: A Review," Chem. Mater. 1991, 3, 242–252; Jack, "SiAlON Ceramics: Retrospect and Prospect," Mat. Res. Soc. Symp. Proc. Vol. 287 (1993), pp. 15–27; Katz, "Applications of Silicon Nitride Based Ceramics in the U.S.," Mat. Res. Soc. Symp. Proc. Vol. 287 (1993), pp. 197–208; Hoffman, "Analysis of Microstructural Development and Mechanical Properties of $Si_3N_4$ Ceramics," Tailoring of Mechanical Properties of $Si_3N_4$ Ceramics (M. J. Hoffman and G. Petzow (eds.)), pp. 59–72 (1994); Shen et al., "Temperature Stability of Sm-doped α'-SiAlON Ceramics," J. Euro. Ceram. Soc., 16[1], 43–53 (1996); Shen et al., "Yb stabilized α'-SiAlON," J. Physics B: Applied Phys., 29[3], 893–904 (1996); Sheu, "Microstructure and Mechanical Properties of β-$Si_3N_4$/α'-SiAlON Composites," J. Am. Ceram. Soc., 77[9], 2345–2353 (1994); all of which are expressly incorporated by reference.

SUMMARY OF THE INVENTION

The materials of the present invention are characterized by a relatively high proportion of an alpha-prime SiAlON phase (i.e., greater than any other phase present, and preferably greater than about 50% by weight of the total composition), and also by the presence of an elongated rod shape grain structure at least part of said alpha prime SiAlON phase for in situ reinforcement. The materials are capable of exhibiting a hardness of at least 19 GPa and an indentation toughness of at least about 5 MPa·m$^{1/2}$. Resulting articles find utility in a number of applications such as automotive engine components, cutting tools, bearings, dies, and other articles requiring properties such as relatively high hardness and toughness values, thermal shock resistance, heat resistance, and electrical resistance.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings:

DETAILED DESCRIPTION OF THE PREFERRED EMBODIMENT

Figure 1:
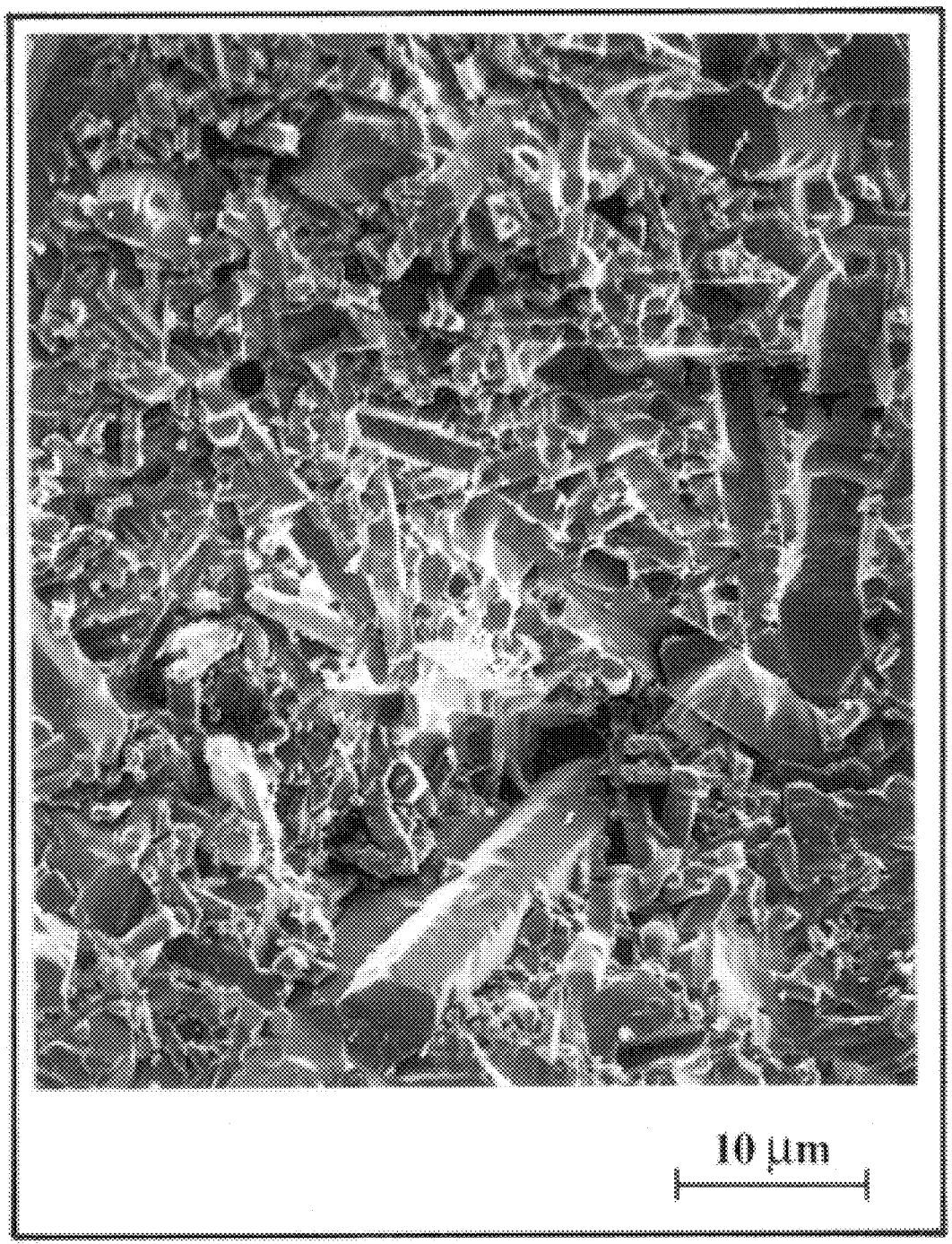
FIG. 1 is a photomicrograph of a preferred material of the present invention.

The preferred material of the present invention is a ceramic compound that is characterized as including an alpha prime SiAlON phase present in an amount greater than any other phase and preferably greater than about 50% by weight of the final material, and still more preferably greater than about 65% by weight of the final material, and still more preferably greater than about 80% by weight of the final composition. The remaining portion of the material may include one or more additional phases (preferably in an amount not to exceed about 50% by weight of the material), such as without limitation, beta silicon nitride, beta prime SiAlON, JEM, an aluminum nitride polytypoid (e.g., without limitation, 8H, 15R, 12H, 21R, 27R, or a mixture thereof), an oxynitride phase, a glass, or mixtures thereof.

The preferred material is also characterized by the presence of a plurality of elongated rod shaped grains. The grains preferably have an average diameter ranging from about 0.3 micron to about 5 microns, and more preferably about 0.4 micron to about 4 microns. The rod shaped grains preferably are composed of alpha prime SiAlON, and preferably are present in an amount greater than about 50 weight % of the resulting alpha prime SiAlON phase. Other alpha prime SiAlON grains may also be present in the phase, such as equiaxed grains.

In one preferred embodiment, the preferred material is substantially free of additional reinforcing materials, apart from the rod shaped grains. In another preferred embodiment, the material incorporates an additional reinforcing material, such as a carbide (e.g., silicon carbide, titanium carbide or the like) or a nitride (e.g., titanium nitride or the like) present in suitable amounts and forms. Other phases or reinforcing materials may also be developed or incorporated.

The preferred final material is also characterized as having a hardness (Vickers) greater than about 19, and more preferably greater than about 20 GPa. Moreover, the preferred final material has an indentation toughness ($K_{1C}$) of at least about 5.0 MPa·m$^{1/2}$, and more preferably at least about 5.5 MPa·m$^{1/2}$, and still more preferably at least about 6 MPa·m$^{1/2}$.

The preferred final material preferably also contains at least one additional element selected from the Li, Mg, Ca, Y, Nd, Sm, Gd, Tb, Dy, Ho, Er, Tm, Yb, Lu, or mixtures thereof, and more preferably from Nd, Yb, Sm, Y, Li, or mixtures thereof.

In one preferred embodiment, the resulting alpha prime phase is further characterized as having the formula $M_x(Si,Al)_{12}(O,N)_{16}$, where M is one of the additional elements of the immediate preceding paragraph and x ranges from about 0.3 to about 1.

In a particularly preferred embodiment, the material of the present invention is prepared by a process including the steps of:

1) providing starting materials;

2) forming a green body including the starting materials; and 3) densifying the green body to form a densified material.

In one particularly preferred embodiment, an additional step is included, according to which alpha prime SiAlON seeds are incorporated in the starting materials prior to forming the green body for prior to densification.

In a preferred embodiment, the starting materials for the present invention include:

(a) beta silicon nitride ($\beta$-$Si_3N_4$);

(b) aluminum nitride (AlN);

(c) alumina ($Al_2O_3$); and (d) at least one additional oxide compound selected from the group consisting of $Li_2O$, MgO, CaO, $Y_2O_3$, $Nd_2O_3$, $Sm_2O_3$, $Gd_2O_3$, $Tb_2O_3$, $Dy_2O_3$, $Ho_2O_3$, $Er_2O_3$, $Tm_2O_3$, $Yb_2O_3$, $Lu_2O_3$, and mixtures thereof.

When the starting materials of the immediate preceding paragraphs are used, the nitrides and oxides preferably are present in any suitable amount that will result in a final product with a relatively high proportion of an alpha prima SiAlON phase. The amount of nitrides and oxides can be readily determined from the formula of alpha prime SiAlON phase referenced herein, from existing phase diagrams, and by reference to the Examples herein, as the skilled artisan will appreciate.

In a particular preferred alternative embodiment, the additional oxide compound is selected from the group consisting of $Nd_2O_3$, $Yb_2O_3$, $Sm_2O_3$ $Y_2O_3$, $Li_2O$, and mixtures thereof. When used, like the other starting materials, the additional oxide compound preferably is present (when employed) in any suitable amount, as the skilled artisan will appreciate, and can be readily determined from (without limitation) existing phase diagrams (amounts of starting materials preferably are chosen to lie within or in relatively close proximity with the single-phase $\alpha$'-SiAlON region), and by reference to the Examples herein. Preferably it is provided as a particulate or pulverulent (e.g., powder) having an average particle size ranging from about 0.1 micron to about 5 microns, and more preferably from about 0.3 micron to about 1 micron.

The beta silicon nitride preferably is provided as a particulate or pulverulent (e.g. powder) having an average particle size ranging from about 0.3 micron to about 5 microns, and more preferably from about 0.6 micron to about 3 microns. In one embodiment, the beta silicon nitride is a powder, such as that available commercially from Denki Kagaku Kogyo Kabushiki Kaisha, Inc. (DENKA), under the designation SN-P21FC. Other forms of beta silicon nitride may also be present. The beta silicon nitride preferably is present in the starting materials in a suitable amount. In one preferred embodiment, the powder contains about 93% by weight beta silicon nitride and about 7% by weight alpha silicon nitride.

The aluminum nitride, also present in a suitable amount, is provided as a particulate or pulverulent (e.g., powder) having an average particle size of about 0.6 micron to about 6 microns, and more preferably about 0.7 micron to about 1.5 microns. In one embodiment, the aluminum nitride is a powder, such as that commercially available from Tokoyama Soda Co., under the designation MAN-05.

The alumina, also present in a suitable amount, is provided as a particulate or pulverulent (e.g., powder) having an average particle size ranging from about 0.1 micron micron to about 1 micron and more preferably from about 0.2 micron to about 0.5 micron. A suitable powder of alumina is available commercially from Sumitomo Chemical America, Inc., under the designation AKP 50.

The starting materials optionally may be of larger or smaller average particle size and may include one or more additives or agents in addition to the foregoing. For instance, suitable amounts of an appropriate sintering aid may be added (e.g., as required primarily in the $\alpha$'-SiAlON phase region).

With all starting materials herein, it will be recognized that some impurities may be present, and tolerable up to certain amounts (depending primarily upon the ultimate application) as the skilled artisan will appreciate. In addition, silicon nitride powders typically contain some oxygen, and its amount can be incorporated in the composition determination, as the skilled artisan will appreciate.

In yet another preferred embodiment, included among the starting materials are seeds generally composed of alpha prima SiAlON. The seeds can be made in any suitable manner, such as (without limitation) from a mixture of alpha silicon nitride $\alpha$-$Si_3N_4$, aluminum nitride (AlN) and a suitable oxide (e.g., without limitation, $Y_2O_3$), using appropriate amounts, as gleaned from an existing phase diagram and with guidance from the Examples herein.

Preferably the seed ingredients are mixed together and the resulting mixture is then hot pressed at a suitable temperature (e.g., about 1600° C.) for a suitable time (e.g., about one hour), under a suitable atmosphere (e.g., nitrogen gas), and pressure (e.g., about 30 MPa). The hot pressed material is then pulverized in any suitable manner to result in a final average seed diameter ranging from about 0.2 micron to about 1 micron. The seeds, when used, preferably are used in an amount of about 2 to about 10% by weight (or volume) of the total ingredients.

To form the final material, all of the starting materials (whether or not they include seeds) are admixed or blended together in one or more steps to form a substantially uniformly distributed powder admixture. The step or steps of admixing may employ any suitable method, including one or more of wet mixing or dry mixing methods. Preferably, a wet mixing method is employed. For example, the starting materials are placed in a container (e.g., milling jar) with a suitable liquid medium (e.g., isopropyl alcohol). Any suitable amount of liquid medium may be employed. For example, one such suitable amount of liquid medium occupies about 60 volume percent relative to the volume of the powder admixture. A suitable milling media (e.g., porcelain, corundum, zirconia, or silicon nitride, milling balls having an average size of about 1 to about 3 mm) is also placed in the container. The starting materials are attrition milled for a suitable time e.g., about 2 hours). After milling, the container is opened and the liquid medium is evaporated, such as by air drying or heating to a temperature of about 50° C. for a suitable time (e.g., about 2 to about 3 hours), the heating being preferred. The admixture may be stored, preferably contained in a suitable container, such as a polyethylene bottle.

After drying, the admixture is densified. In one embodiment, the admixture is first isostatically cold-pressed in a suitable die to form a green body. Preferably one or more pressures are applied to the admixture during cold pressing, using any suitable technique. The pressure ranges from about 15 to about 25 MPa. The load is maintained for any suitable time to achieve the desired density. For instance, times as low as about one minute may be employed. The purpose of this cold-pressing step is to achieve a green density of about 60 to about 70% of theoretical density. Optionally, this cold pressing step may be deleted and the admixture may be hot pressed or otherwise fired without it.

After cold pressing (when employed), the cold-pressed admixture is transferred to a suitable furnace, such as a graphite resistance furnace, for firing. Any suitable press and firing technique may be employed, such as (without limitation) pressureless sintering, gas pressure sintering, hot pressing or hot isostatic pressing. A suitable anneal step may also be employed. It is preferred that firing take place in a substantially static and inert atmosphere (e.g., substantially static or slow flowing nitrogen gas). Firing times may vary depending on techniques employed, but typically involve times ranging from about 2 hours to about 10 hours. Shorter or longer times may be employed, as the skilled artisan would appreciate. Temperatures and pressures also may vary outside of the specified ranges but still achieve a material within the scope of the present invention.

Preferably, regardless of the technique employed, the dies coming into contact with the fired material will be made of a suitable material that will not react with the starting materials. For instance, a graphite die may be employed. The graphite die may have a light coating (e.g., a coating thickness of about 1 mm) of boron nitride powder, or a like material for reducing bonding of the pressed material to the die during firing at elevated temperatures.

The admixture is placed in a suitable furnace (e.g., a graphite resistance furnace) and the furnace is heated to the appropriate temperature range while a suitable pressure is applied (if applied) to the admixture.

As the skilled artisan will appreciate, for techniques involving pressure application, such as hot pressing, the firing step may involve applying pressure during one or more heating stages, such as by heating from a first predetermined temperature to a second predetermined temperature and then cooling to the first predetermined temperature.

For hot pressing, in one illustrative preferred embodiment, one or more pressures ranging from about 10 to about 40, and more preferably about 30 MPa, are applied during a heating stage at a temperature above about 1600° C. Preferably the pressure is maintained for about 1 to about 10 hours. During hot pressing and, optionally, during an additional annealing step, the furnace is maintained at a temperature of about 1700° C. to about 1850° C., and more preferably about 1750° C. to about 1850° C. for about 1 to about 10 hours. A further optional annealing step may be performed also, such as by heating to a temperature of about 2000° C., in an atmosphere of about 1 atm nitrogen gas for a time of about 0.25 to about 2 hours.

In a preferred embodiment, for gas pressure sintering, the materials are heated at one or more temperatures in the range of about 1800° C. to about 2000° C., and nitrogen gas is applied in an overpressure ranging from about 1 atm to about 25 atm for about 1 to about 3 hours. To illustrate, without limitation, one preferred firing method includes a two-stage gas pressure sintering where, in the first stage, the admixture is heated at a temperature of about 1800° C. for about 1 hour under about 4 atm nitrogen gas overpressure, followed thereafter by heating at a temperature of about 2000° C. for about 2 hours under about 25 atm nitrogen gas overpressure. In another illustrative embodiment, the material may be gas pressure sintered at a temperature of about 2000° C. for about 2 hours. As the above indicates, in a preferred embodiment, the process for making the material of the present invention advantageously does not require overpressures greater than about 100 atm.

Preferably the firing conditions are selected and employed so as to achieve a density of at least about 95 to about 99, and more preferably at least about 98% of theoretical density.

The above combination of steps is selected to yield a resulting structure which is believed to directly increase the hardness and toughness of the novel materials of this invention as compared with conventional silicon nitride materials, particularly those having relatively high contents (e.g., greater than about 50% by weight of the material) of beta silicon nitride or beta prime SiAlON.

Figure 2:
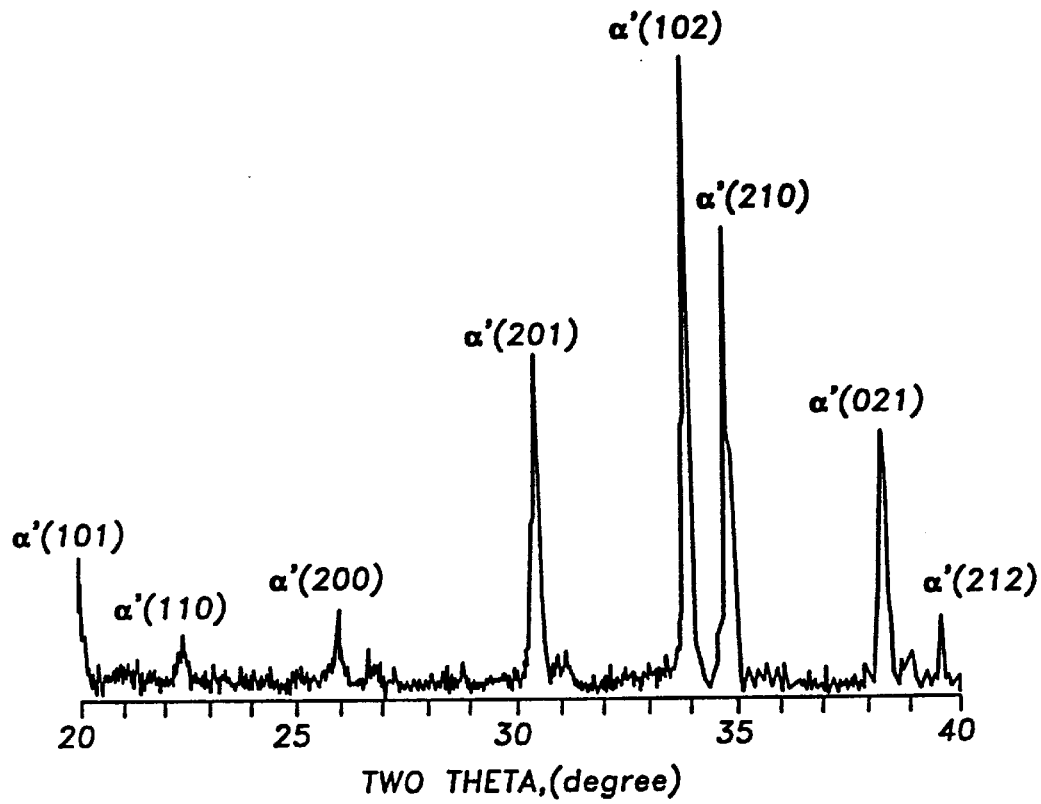
FIG. 2 is an x-ray diffraction analysis readout for a preferred material of the present invention.

A microstructure containing alpha prime SiAlON is preferably formed, such as that shown in FIG. 1. That scanning electron microscope micrograph depicts a fracture surface of a preferred material of the present invention, such as the material resulting from Example A, which is made by sintering at about 2000° C. at about 25 atm of nitrogen gas overpressure for about 2 hours. The resulting material has about 95 volume % α'-SiAlON and about 5 volume % of a glassy phase as a dispersed second phase. Preferably, the second phase is dispersed substantially uniformly throughout the structure. The resulting alpha prime SiAlON grains generally grow as elongated "rod-like" grains thereby making them attractive candidates as in-situ reinforcements for composite systems. Confirmation of the presence of alpha prime SiAlON may be made by suitable analytical techniques. For instance, FIG. 2 illustrates a readout from use of x-ray diffraction analysis, which indicates the presence of alpha prime SiAlON in a material, such as that shown in FIG. 1.

Figure 3:
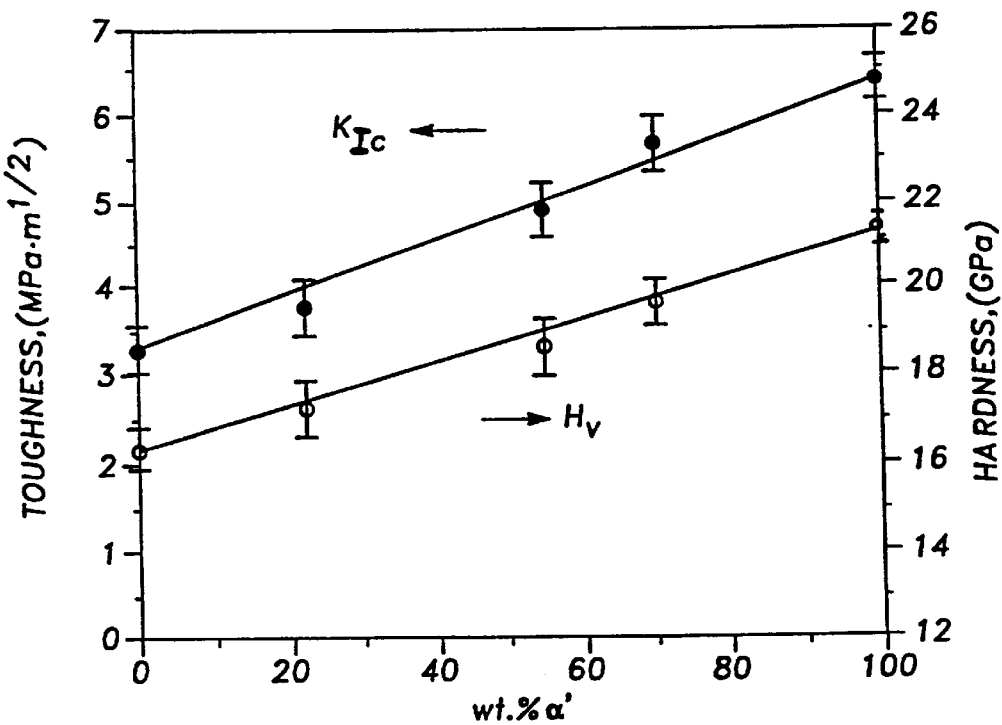
FIG. 3 is a graphical depiction to illustrate the relationship of the amount of alpha prime SiAlON phase, toughness and hardness.

FIG. 3 depicts a plot of toughness and hardness relative to weight percent of alpha prime SiAlON having the composition of the following Examples C and D, but heat treated to obtain different relative amounts of alpha prime SiAlON phases. Specifically, the material is heated at about 1650° C. for about 1 hour for the plot indicating 0% α'-SiAlON. The material is heated at about 1850° C. for about 0.5 hour, for the plot indicating about 22% α'-SiAlON. The material is heated at about 1850° C. for about 1.5 hour, for the plot indicating about 55% α'-SiAlON. The material is heated at about 1850° C. for about 2.5 hours, for the plot indicating about 70% α'-SiAlON. The material is heated at about 1850° C. for about 2.5 hours followed by a heat at about 2000° C. for about 0.25 hours, for the plot indicating 100% α'-SiAlON. All heat treatments are in a nitrogen gas environment at a pressure of about 1 atm except when heated at about 2000° C. when the pressure is about 20 atm.

The following examples, though not intending to be limiting, illustrate the present invention.

EXAMPLES A–I

The following Examples A–I illustrate, without limitation, how certain processing conditions and compositions can be varied, but yield a final product within the scope of the present invention. Various of these Examples use Nd and Yb since they represent two types of rare earth metals that enter alpha prime SiAlON solid solutions. Examples using another rare earth metal, Sm, which is intermediate between Nd and Yb, and other non-rare earth metals, such as Y and Li, are also given to illustrate (without limitation) the present invention. Although these Examples are selected to illustrate how certain processing conditions and compositions can (in various instances) be varied to obtain a final product that contains greater than 85% by weight alpha prime SiAlON, the skilled artisan will appreciate other compositions and processing conditions, within the intent and scope of the present invention, may be used to yield a product of a different alpha prime SiAlON amount and with a different combination of microstructure and properties that are suitable for an intended application and still fall within the scope of the present invention. For example, strength can be enhanced by using a slightly lower heating temperature and a slightly shorter heating time, to yield a slightly lower content of alpha prime SiAlON elongated rod shape grains of a slightly smaller diameter and length.

In the Examples, a seed is formed (optionally, where noted) from starting materials, per Table II. The seed (if used) is then incorporated into the starting materials as indicated in the corresponding column in Table III. (In Table III, β-Si$_3$N$_4$ refers to a mixture of 93% β-Si$_3$N$_4$ and 7% α-Si$_3$N$_4$). Table IV lists properties corresponding to the materials of the particular Examples. Table V lists the formula for the resulting alpha prime SiAlON phases. Table VI lists the phases of the materials resulting from Examples A–I. The materials are prepared in accordance with the following procedures.

As to Examples A–I where seeds are made, the seeds are prepared by hot pressing at about 1600° C. for about 1 hour, in a nitrogen gas atmosphere, at a pressure of about 30 Mpa, and then pulverized. Except in Example G, the starting β-Si$_3$N$_4$ powders are all of the type available from Denki Kagaku Kogyo Kabushiki Kaisha, Inc., with an average particle size of about 0.6 micron and containing about 93 weight % β-Si$_3$N$_4$ and about 7 weight % α-Si$_3$N$_4$. In Example G, the starting β-Si$_3$N$_4$ powders are obtained by converting α-Si$_3$N$_4$ powders (such as that available from Ube, Inc., under the designation E-10) at about 1900° C. for about 45 minutes and have an average particle size of about 1 micron. After conversion, these powders generally show only β-Si$_3$N$_4$ according to x-ray diffraction analysis. To these converted powders, approximately 7 weight % α-Si$_3$N$_4$ powders are added and the mixture is used as starting powders. In instances where concentrations are specified on a weight percent basis, the skilled artisan should appreciate that such amounts are readily converted to weight/weight ratios or volume percent. All hardness and toughness measurements are performed using an indentation load of 10 kg. Under such condition, a typical commercial grade of in-situ toughened beta silicon nitride has a hardness of about 15.5 GPa and an indentation toughness of about 6.2 MPa·m$^{1/2}$; and a typical product of alpha prime SiAlON has a hardness of about 20.5 GPa and an indentation toughness of 3.0 MPa·m$^{1/2}$.

For the material of Example A, the starting materials are gas pressure sintered in two stages; in the first stage, materials are heated to a temperature of about 1800° C. for about 1 hour under about 4 atm nitrogen gas overpressure, followed by a heat to about 2000° C. for about 2 hours, at about 25 atm nitrogen gas overpressure. Similar results are obtained when the material is hot pressed at about 1850° C. for about 3 hours (and at a pressure of about 30 MPa in an atmosphere of nitrogen gas) and then annealed at about 2000° C. for about 2 hours (at a pressure of about 25 atm, in an atmosphere of nitrogen gas).

For the material of Example B, the starting materials are gas pressure sintered in two stages; in the first stage, materials are heated to a temperature of about 1800° C. for about 1 hour under about 4 atm nitrogen gas overpressure, followed by heating to about 2000° C. for about 2 hours, at about 25 atm nitrogen gas overpressure. Similar results are obtained when the material is hot pressed at about 1850° C. for about 3 hours (and at a pressure of about 30 MPa in an atmosphere of nitrogen gas) and then annealed at about 2000° C. for about 2 hours ((at a pressure of about 25 atm), in an atmosphere of nitrogen gas).

For the material of Example C, the starting materials are gas pressure sintered in two stages; in the first stage, materials are heated to a temperature of about 1800° C. for about 1 hour under about 4 atm nitrogen gas overpressure, followed by a heat to about 2000° C. for about 2 hours, at about 25 atm nitrogen gas overpressure.

For the material of Example D, starting materials are hot pressed at about 1850° C. for about 3 hours at about 30 MPa in an atmosphere of nitrogen gas. The materials are thereafter annealed at about 2000° C. for about 0.25 hours at about 25 atm of nitrogen gas overpressure.

For the material of Example E, the starting materials are hot pressed at a temperature of about 1700° C., a pressure of about 30 MPa, in an atmosphere of nitrogen gas, for about 10 hours. The materials are thereafter annealed at about 1800° C. for about 2 hours in an atmosphere of nitrogen gas and a pressure of about 1 atm.

For the material of Example F, the starting materials are hot pressed at a temperature of about 1800° C. for about 3 hours in an atmosphere of nitrogen gas and at a pressure of 30 MPa. The materials are thereafter annealed at a temperature of about 1900° C. for about 2 hours in an atmosphere of nitrogen gas and a pressure of 25 atm.

For the material of Example G, the starting materials are hot pressed at a temperature of about 1750° C. for about 3 hours, under a pressure of about 30 MPa and an atmosphere of nitrogen gas. As to the starting materials, β-Si$_3$N$_4$ powder is prepared by conversion of α-Si$_3$N$_4$ (UBE-SNE 10) at about 1900° C. for about 45 minutes at about 25 atm of nitrogen gas and has an average particle size of about 1 micron.

For the material of Example H, the starting materials are hot pressed at about 1650° C. for about 10 hours, under a pressure of about 30 MPa and an atmosphere of nitrogen gas.

For the material of Example I, starting materials are hot pressed at about 1850° C. for about 2.5 hours, under a pressure of about 30 MPa and an atmosphere of nitrogen gas.

TABLE II

Starting Materials (For Seeds)

| Seed | WT % (of Total Seed Ingredients) | | | | | | | | |
|---|---|---|---|---|---|---|---|---|---|
|  | A | B | C | D | E | F | G | H | I |
| α-Si$_3$N$_4$ | 79.6 | — | 79.6 | 79.6 | 79.6 | 79.6 | — | — | — |
| AlN | 14.1 | — | 14.1 | 14.1 | 14.1 | 14.1 | — | — | — |
| Y$_2$O$_3$ | 6.3 | — | 6.3 | 6.3 | 6.3 | 6.3 | — | — | — |

TABLE III

Starting Materials (For Final Material)

| | WT % (of Total Starting Ingredients) | | | | | | | | |
|---|---|---|---|---|---|---|---|---|---|
|  | A | B | C | D | E | F | G | H | I |
| β-Si$_3$N$_4$ | 70.8 | 74.5 | 71.7 | 71.7 | 68.5 | 78.6 | 74.3 | 72.7 | 75.4 |
| AlN | 12.2 | 12.8 | 12.7 | 12.7 | 13.8 | 10.6 | 13.1 | 13.4 | 13.2 |
| Al$_2$O$_3$ | 1.5 | 1.6 | 0.3 | 0.3 | 2.6 | — | 0.3 | 3.7 | 0.3 |
| Nd$_2$O$_3$ | 10.5 | 11.1 | 10.3 | 10.3 | — | — | — | — | — |
| Seed | 5.0 | — | 5.0 | 5.0 | 5.0 | 5.0 | — | — | — |
| Yb$_2$O$_3$ | — | — | — | — | 10.1 | — | 12.3 | 9.5 | — |
| Y$_2$O$_3$ | — | — | — | — | — | 5.8 | — | — | — |
| Li$_2$O | — | — | — | — | — | — | — | 0.7 | — |
| Sm$_2$O$_3$ | — | — | — | — | — | — | — | — | 11.1 |

TABLE IV

Resulting Properties and Characteristics (measured at 10 kg load)

| | Hardness (GPa) | $K_{IC}$ (MPa · m$^{1/2}$) |
|---|---|---|
| A: | 20.6 ± 0.4 | 6.2 ± 0.3 |
| B: | 20.5 ± 0.3 | 5.9 ± 0.25 |
| C: | 21.1 ± 0.4 | 6.3 ± 0.4 |
| D: | 21.2 ± 0.5 | 6.4 ± 0.4 |
| E: | 19.4 ± 0.5 | 5.3 ± 0.4 |
| F: | 20.8 ± 0.3 | 5.1 ± 0.4 |
| G: | 20.5 ± 0.3 | 5.8 ± 0.4 |
| H: | 21.2 ± 0.4 | 5.4 ± 0.3 |
| I: | 20.4 ± 0.3 | 6.2 ± 0.3 |

TABLE V

Formula for Alpha Prime SiAlON Phase

| | |
|---|---|
| A: | $Nd_{0.4}Si_{9.6}Al_{2.4}O_{1.2}N_{14.8}$ |
| B: | $Nd_{0.4}Si_{9.6}Al_{2.4}O_{1.2}N_{14.8}$ |
| C: | $Nd_{0.4}Si_{9.9}Al_{2.1}O_{0.9}N_{15.1}$ |
| D: | $Nd_{0.4}Si_{9.9}Al_{2.1}O_{0.9}N_{15.1}$ |
| E: | $Yb_{0.33}Si_9Al_3O_2N_{14}$ |
| F: | $Y_{0.33}Si_{10.4}Al_{1.6}O_{0.6}N_{15.4}$ |
| G: | $Yb_{0.4}Si_{9.9}Al_{2.1}O_{0.9}N_{15.1}$ |
| H: | $(Yb,Li)_{0.33}Si_{9.9}Al_{2.1}O_{0.9}N_{15.1}$ |
| I: | $Sm_{0.4}Si_{9.9}Al_{2.1}O_{0.9}N_{15.1}$ |

TABLE VI

Characterization of Phases in Final Material

A: greater than about 95 weight % alpha prime SiAlON; balance glass
B: greater than about 95 weight % alpha prime SiAlON; balance glass
C: greater than about 85 weight % alpha prime SiAlON; less than about 15 weight % JEM phase and glass
D: greater than about 85 weight % alpha prime SiAlON; less than about 15 weight % JEM phase and glass
E: greater than about 85 weight % alpha prime SiAlON; less than about 15 weight % 12 H polytypoid and glass
F: greater than about 85 weight % alpha prime SiAlON; less than about 15 weight % beta prime SiAlON and glass
G: about 95 weight % alpha prime SiAlON; balance glass
H: greater than about 95 weight % alpha prime SiAlON; balance glass
I: greater than about 85 weight % alpha prime SiAlON; less than about 15 weight % beta silicon nitride and glass Although the invention has been described with particular reference to certain preferred embodiments thereof, variations and modifications can be effected within the spirit and scope of the following claims.

What is claimed is:

1. A method for making an alpha prime SiAlON-based ceramic article, comprising the steps of:

a) providing an admixture of starting materials, including:
      i) beta silicon nitride.
      ii) a source of aluminum selected from the group consisting of aluminum nitride, alumina, and mixtures thereof;
      iii) at least one oxide compound selected from the group consisting of $Li_2O$, $MgO$, $CaO$, $Y_2O_3$, $Nd_2O_3$, $Sm_2O_3$, $Gd_2O_3$, $Tb_2O_3$, $Dy_2O_3$, $Ho_2O_3$, $Er_2O_3$, $Tm_2O_3$, $Yb_2O_3$, $Lu_2O_3$, and mixtures thereof; and
      iv) a plurality of alpha prime SiAlON seeds having a seed diameter ranging from about 0.2 micron to about 1 micron, said seeds being present in an amount of about 2 to about 10% by weight of the total starting materials;

b) densifying said admixture for forming an article having a first phase of at least about 50% by weight of the final material of an alpha prime SiAlON phase;
   said ceramic article having an indentation toughness of at least about 5 MPa·m$^{1/2}$;
   said first phase including a plurality of alpha prime SiAlON elongated rod shape grains, wherein said article has a hardness of at least about 19 GPa.

2. A method according to claim 1, wherein said alpha prime SiAlON has the formula $M_x(Si,Al)_{12}(O,N)_{16}$, wherein M is an element selected from the group consisting of Li, Mg, Ca, Y, Nd, Sm, Gd, Tb, Dy, Ho, Er, Tm, Yb, Lu, and mixtures thereof, and x ranges from about 0.3 to about 1.

3. A method according to claim 1, wherein said alpha prime SiAlON is present in an amount greater than about 65% by weight of the final material.

4. A method according to claim 1, wherein said alpha prime SiAlON is present in an amount greater than about 80% by weight of the final material.

5. A method according to claim 1, wherein said densifying step (b) includes forming a plurality of elongated alpha prime SiAlON grains having a diameter of about 1 micron.

6. A method according to claim 1, further comprising admixing $\alpha$-$Si_3N_4$, AlN, and $Y_2O_3$ for forming said plurality of alpha prime SiAlON seeds.

* * * * *

UNITED STATES PATENT AND TRADEMARK OFFICE
CERTIFICATE OF CORRECTION

PATENT NO : 6,139,791
DATED : October 21, 2000
INVENTOR(S) : I-Wei Chen, et al.

It is certified that error appears in the above-identified patent and that said Letters Patent is hereby corrected as shown below:

Col. 12, line 13 replace "$Fr_2$" with -- $Er_2$ --.

Col. 12, line 32 replace "Th" with --Tb--.

Signed and Sealed this

First Day of May, 2001

Attest:

Attesting Officer

NICHOLAS P. GODICI

Acting Director of the United States Patent and Trademark Office